Figure 5:
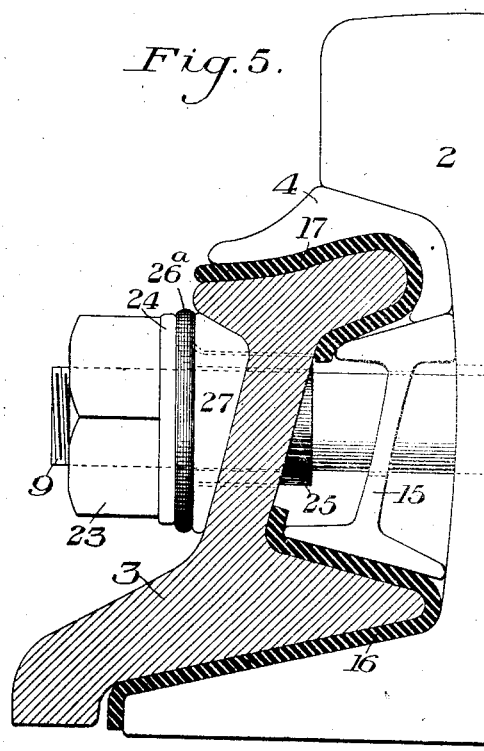

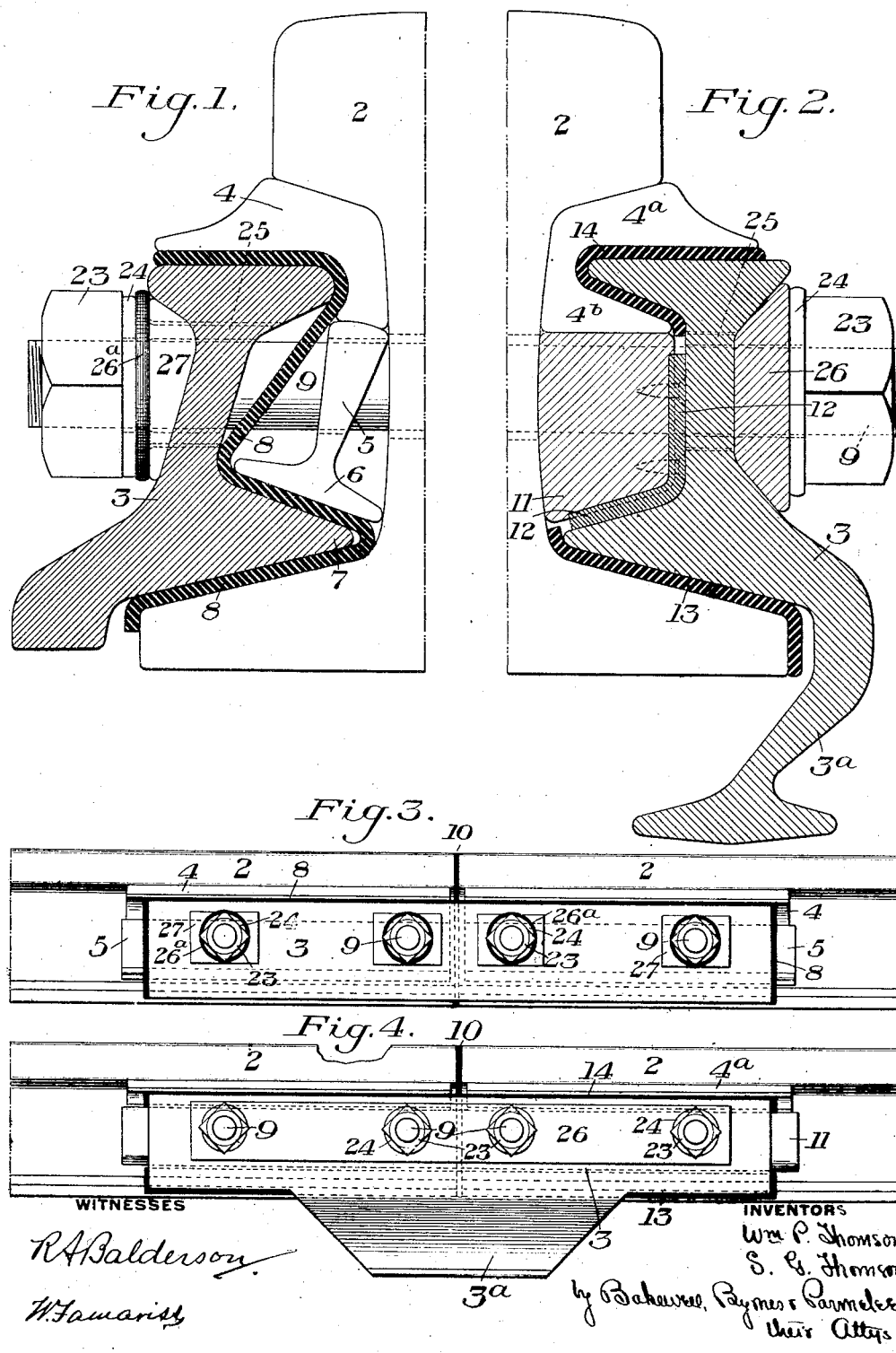

W. P. & S. G. THOMSON.
RAIL JOINT.
APPLICATION FILED JULY 15, 1910.

985,858.

Patented Mar. 7, 1911.

2 SHEETS—SHEET 2.

WITNESSES
R. A. Balderson
W. Famariss

INVENTORS
Wm P. Thomson
S. G. Thomson
by Bakewell, Byrnes & Parmelee
their Attys.

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

985,858.  Specification of Letters Patent.  Patented Mar. 7, 1911.

Application filed July 15, 1910. Serial No. 572,116.

*To all whom it may concern:*

Be it known that we, WILLIAM P. THOMSON and SAMUEL G. THOMSON, both of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figures 1, 2, 5 and 6 are sectional views illustrating different embodiments of our invention; Figs. 3, 4 and 7 are side elevations of the joints shown in Figs. 1, 2 and 6 respectively.

Our invention has relation to rail joints of the insulated type, and is designed to provide an efficient joint of this character containing numerous advantages, some of which will be hereinafter pointed out; and our invention consists of a novel arrangement of inner and outer splice bars or members hereinafter described and claimed.

Referring first to the form of our invention shown in Figs. 1 and 3, the numeral 2 designates the rails, 3 an outer splice bar, 4 an inner splice bar fitting underneath the head portion of the rail, and 5 another inner splice bar having a broad base portion 6 which is supported on an inwardly projecting flange 7 of the outer splice bar 3, and which contacts with and supports the depending portion of the upper, inner splice bar 4. 8 is a continuous piece of insulation which extends between the base portion of the outer splice bar 3 and the base flange of the rail, between the inwardly projecting portion 7 of the outer splice bar 3 and the base of the lower inner splice bar 6, and between the upper portion of the outer splice bar and the upper inner splice bar 4. 9 designates joint bolts which pass through the outer splice bar 3 and lower inner splice bar 5. There are two of the upper inside bars at each side of the rails, each bar contacting with one rail only; and in this form there are also two of the lower inside bars 5, each contacting with one rail only. All four of these inside bars are insulated from the outer bar by the insulation 8 which extends continuously across the joint. The end post 10 between the rail ends also keeps these inside bars electrically insulated from each other. The upper inside bars have broad under insulation bearing faces to extend over and be supported by the outside bar, and they also have a lower or end bearing face, affording a solid metallic seat on the lower bars 5, which lower bars in turn provide another very broad under insulating bearing face on the inwardly projecting flange of the outer bar 3.

In the modification shown in Figs. 2 and 4, the outer bar is shown as having a central portion $3^a$ depending below the bases of the rails; and instead of the two lower inner bars 5, a continuous block 11 of non-metallic material, preferably wood, is employed. This block extends continuously across the joints and acts with the outer splice bar as a stiffening member. A metal plate 12 may be fastened to this block along its outer and lower faces in order to increase its stiffness. This metal plate contacts directly with the outer splice bar, but the block insulates such plates from both rails, and also from both of the upper inner plates $4^a$. The block 11, in addition to its value as a stiffening and insulating member, also affords a broad upper bearing and supporting face for the upper inner bars, each of which transfers the load separately to the outer bar and to this block. The outer bar having the deep flange $3^a$ extending below the rail, in connection with this continuous inner block, affords ample stiffness, while the novel arrangement of the inner and outer bars give very wide insulating bearing faces to prevent the interposed insulation from crushing out. In this form, the insulation is divided into two parts, one part 13 being interposed between the base flange of the rail and the outer bar, and the other piece 14 being interposed between the bar $4^a$ and the head portion of the outer bar. The bar $4^a$ in this form is shown as having its lower portion $4^b$ extending inwardly underneath the inwardly projecting top flange of the outer bar in order to provide increased insulation bearing surface, and also to give a broader bearing upon the continuous block 11.

The form shown in Fig. 5 is somewhat similar to that shown in Fig. 1. The lower inner bars 15 are, however, of general I- beam form, each contacting with only one rail, and insulated from the outer bar by the insulation members 16 and 17. This form of the inner bars affords a support under the head of the outer bar, and also a broad insulating bearing face on the foot portion of the outer bar.

Figure 6:
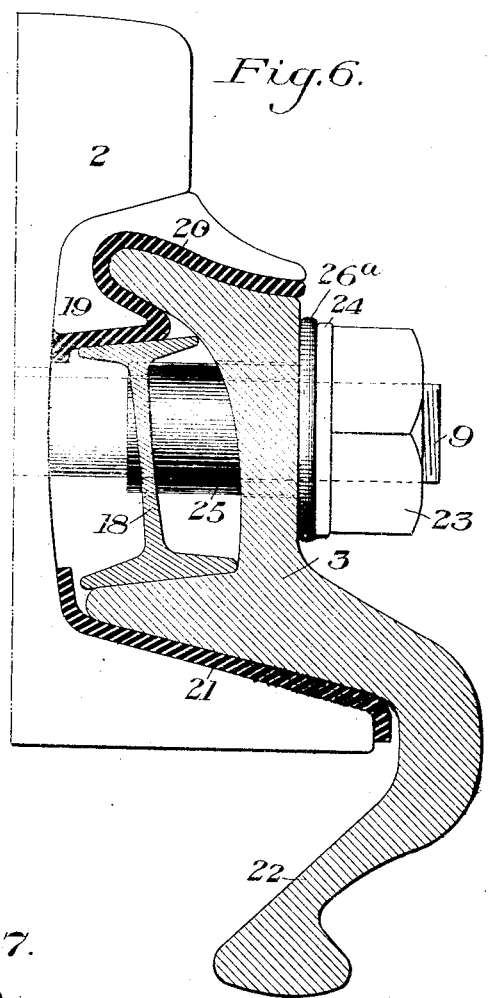
Figure 7:
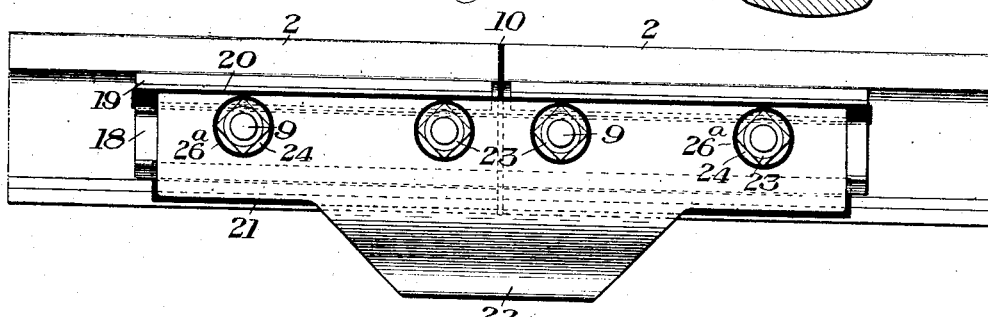

In the form shown in Figs. 6 and 7, the inner bar 18 extends continuously across the joint, only one bar being used at each side of the rails, and taking the place of the continuous block 11 of Fig. 2. This bar is of I-beam form having its base flange directly supported on the inward projection of the outer bar and its head supporting the upper inner bar 19. Insulation 20 is interposed between the bar 19 and the head of the outer bar, and also between the inner bar 19, and the head of the bar 18. Insulation 21 is interposed between the base flange of the rail and the lower portion of the outer bar. The outer bar of these figures is also shown as having a portion 22 extending below the rail base. 23 wherever seen designates bolt heads or nuts, and 24 washers which are interposed between the heads or nuts and the material 26 or 26ª, which insulates said heads or nuts from the outer splice bars. The material 26, which in Fig. 2 is preferably wood made in one continuous piece to extend under two or more 't heads or nuts, but any other sort of in- ulating material may be used in the same manner, and in any case this insulating material may be made in the form of a separate washer for each bolt head or nut.

27 in Figs. 1 and 5 designates metallic washers to provide vertical bolting faces.

25 in Figs. 5 and 6 designates insulating sleeves or thimbles, which surround the bolts where they pass through the outer bar. In Fig. 6 these thimbles also pass through the inner bar 18. While the drawings show but one side of a complete joint, it will be understood that we preferably employ a similar arrangement of bars at each side of the rails. It will be further understood that our invention is applicable to rails of various sections by modification in the form of the inside bars, and that the particular forms of both inner and outer bars, as we have shown herein, are illustrative only, and may be widely varied in practice, our invention consisting rather in the general arrangement of the inner and outer bars than in the particular forms of these members. Either one of the inner bars can be used for a number of different sections of rails by varying the size of the other inner bar. By using a continuous inner bar as shown in Figs. 2, 4, 6 and 7, which is fastened to both rails, a splicing and stiffening member is provided, as well as a bearing and supporting member for the upper inside bars, each of which contacts with one rail only. As shown, this continuous inner bar may be made either of wood or of metal. In the latter case, it must, as shown, be insulated from the inner bars which contact with the rails. Step joints for joining rails of different sections can be readily constructed in accordance with our invention by varying the thickness of one of the inner bars, which is opposed to only one of the rails. The inner bars which bear underneath the rail heads can be readily renewed when worn without the necessity for renewing the lower inner bars, thus reducing the renewal of metallic parts to a minimum. It will be seen that in all cases broad insulation bearing faces are provided, which are very effective in extending the life of the insulation by preventing it from rapid cutting and wear.

What we claim is:—

1. In a rail joint, an outer bar and two inner bars, one of said inner bars having its lowermost portion overlying the uppermost face of the other inner bar and also having a portion overlying the outer bar.

2. In a rail joint, one outer bar extending under and supporting two inner bars, one of said inner bars having its uppermost face extending under and supporting the lowermost portion of the other.

3. In a rail joint, an outer bar and two inner bars, the upper one of said inner bars contacting with one rail only and having a downwardly extending portion which increases in thickness toward its lower end, and the lower one of said inner bars extending opposite both rails and overlying a portion of the outer bar.

4. In a rail joint, an outer bar and two inner bars, one of said inner bars contacting with one rail only and having its lowermost portion forming an under bearing face to overlie a portion of the other inner bar, said other inner bar extending opposite to both rails and overlying a portion of the outer bar.

5. In a rail joint, two inner bars and an outer bar, one of said inner bars having an under bearing face overlying said outer bar, said inner bar also having an under bearing face overlying the other inner bar, the other of said inner bars having an under bearing face overlying a portion of the outer bar.

6. In a rail joint, an outer and an inner bar, each extending opposite to both rails, said inner bar extending under and supporting the lower extremity of each of two other inner bars each contacting with one rail only.

7. In a rail joint, an outer and an inner bar, each extending opposite to both rails, said inner bar having its upper face extending under and supporting the lowermost portion of each of two other inner bars each contacting with one rail only, and means for insulating the rails from each other and from said splice bars.

8. In a rail joint, an outer bar and two inner bars, one of said inner bars having its lowermost portion overlying the upper face of the other inner bar and also having a portion overlying the outer bar, and means for insulating said outer bar from the rails.

In testimony whereof, we have hereunto set our hands.

WILLIAM P. THOMSON.
SAMUEL G. THOMSON.

Witnesses:
 ROBERT W. KINCADE,
 McLEOD THOMSON.

Copies of this patent may be obtained for five cents each, by addressing the "Commissioner of Patents, Washington, D. C."